(12) United States Patent
Lawn et al.

(10) Patent No.: US 12,716,806 B2
(45) Date of Patent: Aug. 25, 2026

(54) MEASURING DEVICE AND WIND TUNNEL TEST DEVICE USING SAME

(71) Applicants: JAPAN WIND TUNNEL MANUFACTURING Inc., Kurume (JP); NISHIYAMA CORPORATION, Tokyo (JP); Yamato Scale Co., Ltd., Akashi (JP)

(72) Inventors: Joshua Lawn, Kurume (JP); Hideaki Nakahora, Kurume (JP); Norimichi Uemura, Kurume (JP); Shinichi Miyazaki, Akashi (JP); Shota Hattori, Akashi (JP); Masashi Fukushima, Akashi (JP)

(73) Assignees: JAPAN WIND TUNNEL MANUFACTURING INC, Kurume (JP); NISHIYAMA CORPORATION, Tokyo (JP); YAMATO SCALE CO., LTD., Akashi (JP)

( * ) Notice: Subject to any disclaimer, the term of this patent is extended or adjusted under 35 U.S.C. 154(b) by 263 days.

(21) Appl. No.: 18/728,782

(22) PCT Filed: Dec. 28, 2022

(86) PCT No.: PCT/JP2022/048638

§ 371 (c)(1),
(2) Date: Jul. 12, 2024

(87) PCT Pub. No.: WO2023/136180

PCT Pub. Date: Jul. 20, 2023

(65) Prior Publication Data

US 2025/0076150 A1 Mar. 6, 2025

(30) Foreign Application Priority Data

Jan. 13, 2022 (JP) ................................ 2022-003423

(51) Int. Cl.
*G01M 9/04* (2006.01)
*G01M 9/02* (2006.01)
(Continued)

(52) U.S. Cl.
CPC .............. *G01M 9/04* (2013.01); *G01M 9/062* (2013.01); *G01M 17/007* (2013.01); *G01M 9/02* (2013.01); *G01M 9/06* (2013.01)

(58) Field of Classification Search
CPC ...... G01M 9/04; G01M 9/062; G01M 17/007; G01M 9/02; G01M 9/06
(Continued)

(56) References Cited

U.S. PATENT DOCUMENTS 4,372,159 A * 2/1983 Doggett, Jr. ............ G01M 9/04 73/147
2010/0070126 A1 3/2010 Litz
(Continued)

FOREIGN PATENT DOCUMENTS

CN 105021371 A 11/2015
JP 58-35435 A 3/1983
(Continued)

OTHER PUBLICATIONS

Extended European Search Report for European Application No. 22920695.8, dated Dec. 8, 2025.
(Continued)

*Primary Examiner* — Peter J Macchiarolo
*Assistant Examiner* — John M Royston
(74) *Attorney, Agent, or Firm* — Birch, Stewart, Kolasch & Birch, LLP

(57) ABSTRACT

A measuring device according to the present invention is for a vehicle arranged downstream of air blown from a blower for a wind tunnel test, the measuring device comprising: a measuring device main body configured to enable the
(Continued)

arrangement of the vehicle and movement thereof relative to the blower; and a splitter connected to an end of the measuring device main body facing the blower side, wherein the splitter has: a main body portion having an upper surface continuous with the upper surface of the measuring device main body and a lower surface having a surface extending downward as the distance from the blower side increases; and a plate-shaped tip member extending from the tip of the main body portion toward the blower side, the upper surface of the tip member is formed to be continuous with the upper surface of the main body portion, an edge of the lower surface of the tip member on the blower side is positioned closer to the main body portion than an edge of the upper surface of the tip member on the blower side, and a tip surface connecting the edge of the upper surface and the edge of the lower surface is formed to have an arcuate cross-section.

7 Claims, 10 Drawing Sheets

(51) Int. Cl.
*G01M 9/06* (2006.01)
*G01M 17/007* (2006.01)

(58) Field of Classification Search
USPC ............................................................ 73/147
See application file for complete search history.

(56) References Cited

U.S. PATENT DOCUMENTS

2010/0175465 A1 7/2010 Kato et al.
2017/0212005 A1 7/2017 Walter et al.
2018/0038766 A1 * 2/2018 Knestel ............. G01M 17/0074
2022/0397480 A1 12/2022 Van Campenhout et al.

FOREIGN PATENT DOCUMENTS

JP 60-76639 A 5/1985
JP 61-76929 A 4/1986
JP 7-225176 A 8/1995
JP 2017-111057 A 6/2017
JP 2019-506624 A 3/2019
JP 2021-47086 A 3/2021
KR 10-1581489 B1 1/2016
WO WO 2010/030974 A1 3/2010
WO WO 2021/069676 A1 4/2021

OTHER PUBLICATIONS

International Search Report for PCT/JP2022/048638 (PCT/ISA/210) mailed on Mar. 7, 2023.
Written Opinion of the International Searching Authority for PCT/JP2022/048638 (PCT/ISA/237) mailed on Mar. 7, 2023.
Diebold et al., “Experimental Study of Splitter Plates for Use with Semispan Wing Models,” 53rd AIAA Aerospace Sciences Meeting, Kissimmee, Florida, Jan. 5-9, 2015, pp. 1-14.
Korean Office Action for Korean Application No. 10-2024-7026562, dated Feb. 18, 2026, with English translation.

* cited by examiner (a)

(b)

(a)

(b)

(c)

(d)

(e)

MEASURING DEVICE AND WIND TUNNEL TEST DEVICE USING SAME

TECHNICAL FIELD

The present invention relates to a measuring device of an arranged vehicle on the downstream side of air blown from a blower for a wind tunnel test, and a wind tunnel test device using the measuring device.

BACKGROUND ART

Conventionally, various wind tunnel test devices for performing a wind tunnel test of a vehicle have been proposed. For example, a wind tunnel test device described in Patent Document 1 is an installation type and is provided in a predetermined facility. Further, in the wind tunnel test device, a suction device is provided to suck a boundary layer generated by friction between an air flow and a floor surface.

PRIOR ART DOCUMENTS

Patent Documents

Patent Document 1: Japanese Patent Laid-open Publication No. 2021-47086

SUMMARY OF THE INVENTION

Problems to be Solved by the Invention

However, since the above wind tunnel test device is provided in a predetermined facility, the wind tunnel test device cannot be moved to the outside of the facility. Further, since a suction facility is required to suck a boundary layer, there is a problem that the device becomes large.

The present invention has been made to solve the above problem, and an object of the present invention is to provide a measuring device for a wind tunnel test and a wind tunnel test device that are portable and can reduce influence of a boundary layer.

Means for Solving the Problem

A measuring device according to the present invention is a measuring device for a vehicle arranged on a downstream side of air blown from a blower for a wind tunnel test. The measuring device includes a measuring device main body configured to allow a vehicle to be arranged and configured to be movable with respect to the blower, a splitter coupled to an end portion facing the blower side in the measuring device main body. The splitter includes a main body portion having an upper surface continuous with an upper surface of the measuring device main body and a lower surface having a surface extending further downward as a distance from the blower side increases, and a plate-shaped tip member extending from a tip of the main body portion toward the blower side, an upper surface of the tip member and an upper surface of the main body portion are formed to be continuous, an end edge on the blower side of a lower surface of the tip member is located closer to the main body portion side than an end edge on the blower side of an upper surface of the tip member, and a tip surface connecting an end edge of the upper surface and an end edge of the lower surface is formed to have an arcuate cross-section.

In the measuring device, a length of the tip member protruding from the main body portion can be 75 to 150 mm, and a thickness of the tip member can be 1 to 8 mm.

In the measuring device, a tip radius of the tip surface is ⅖ to ⅗ mm of a thickness of the tip member.

In the measuring device, the measuring device main body can be configured by coupling a plurality of measurement modules in which at least one load cell is accommodated.

The measuring device can further include a plurality of measurement modules in which at least one load cell is accommodated, and at least one coupling module. The measuring device main body can be configured by using at least one of a first coupling mode in which a plurality of the measurement modules are coupled to each other and a second coupling mode in which a plurality of the measurement modules are coupled to each other via the coupling module.

In the measuring device, each of the measurement modules can include a flat lid body that supports a wheel of the vehicle, and a moving mechanism capable of changing a position of the load cell below the lid body, the lid body can include a disk-shaped wheel support member that supports the wheel and is fixed to the load cell, a disk-shaped first positioning member having a first through hole into which the wheel support member is fitted, a disk-shaped second positioning member having a second through hole into which the first positioning member is rotatably fitted, and a support body portion having a third through hole into which the second positioning member is rotatably fitted, the wheel support member can be arranged immediately below the wheel by rotation of the first and second positioning members, and the load cell can measure force acting on the wheel support member.

A wind tunnel test device according to the present invention includes any of the measuring devices described above and a movable blower.

Advantages of the Invention

According to the present invention, there is portability, and influence of a boundary layer can be reduced.

EMBODIMENTS OF THE INVENTION

Figure 1:
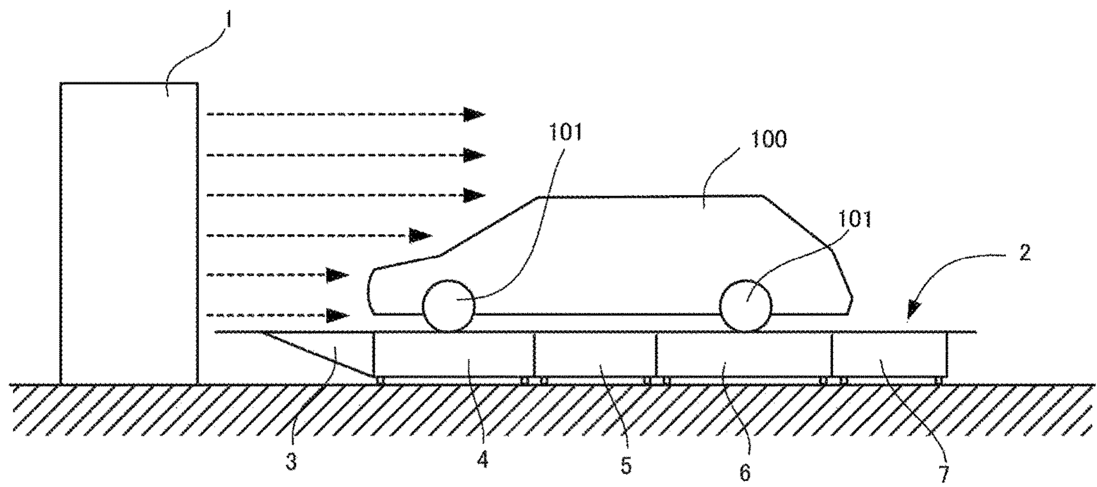
FIG. 1 is a schematic side view of a wind tunnel test device according to an embodiment of the present invention.

Hereinafter, an embodiment of a measuring device for a wind tunnel test according to the present invention will be described with reference to the drawings. FIG. 1 is a schematic side view of a wind tunnel test device.

As illustrated in FIG. 1, the wind tunnel test device includes a blower 1 and a measuring device 2, and air is blown from the blower 1 to a four-wheeled vehicle 100 arranged on the measuring device 2. Then, the measuring device measures a drag acting on a vehicle that receives blown air. The blower is a portable publicly-known blower for a wind tunnel test. Hereinafter, the measuring device will be described in detail.

Figure 2:
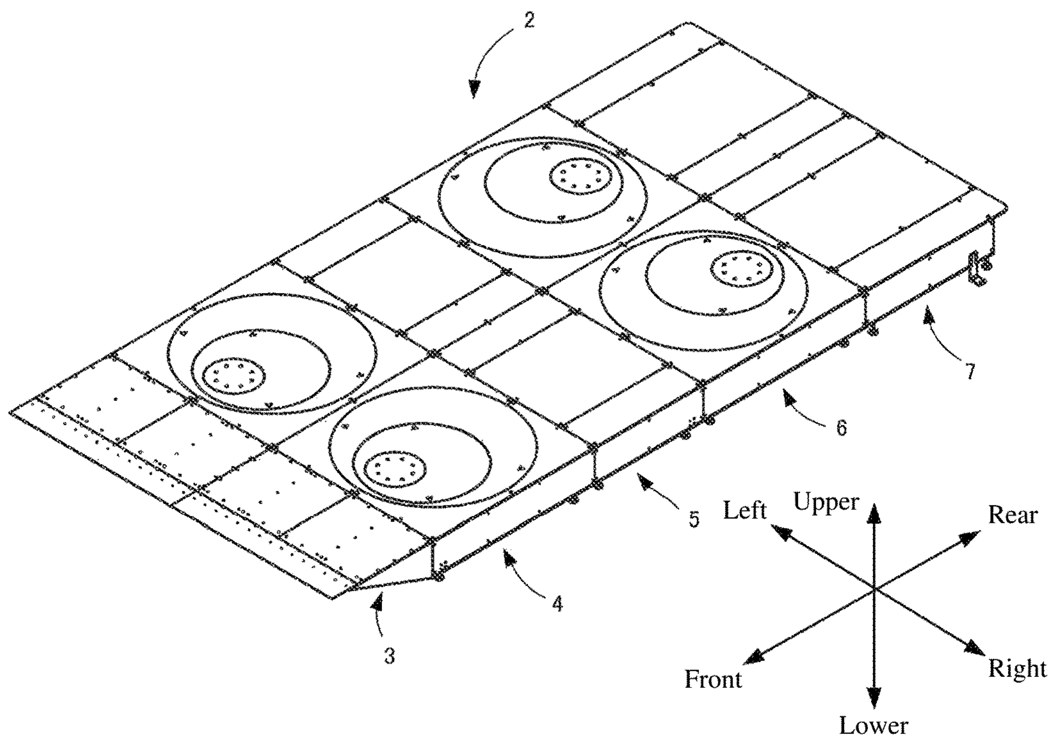
FIG. 2 is a perspective view of a measuring device included in the wind tunnel test device of FIG. 1.
Figure 3:
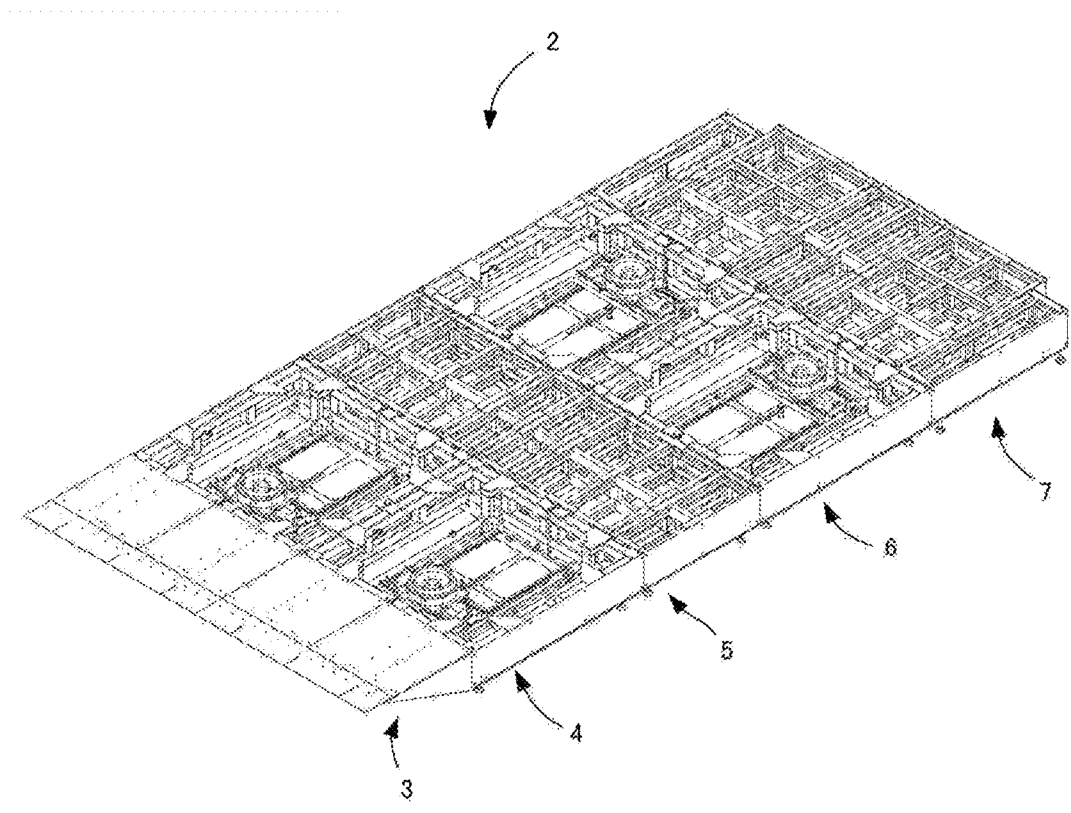
FIG. 3 is a perspective view illustrating a state in which a lid body is removed in the measuring device of FIG. 2.

FIG. 2 is a perspective view of the measuring device, and FIG. 3 is a perspective view illustrating a state in which a lid body is removed in the measuring device of FIG. 2. Hereinafter, for convenience of description, description will be made according to a direction illustrated in FIG. 2.

As illustrated in FIGS. 2 and 3, in the measuring device 2, a splitter 3, a first measurement unit 4, an intermediate portion 5, a second measurement unit 6, and a rear portion 7 are coupled in this order from a front end to a rear end. Note that, in the measuring device 2, a portion other than the splitter 3 corresponds to a measuring device main body of the present invention. Hereinafter, a configuration of these will be described in detail.

1. Splitter

Figure 4:
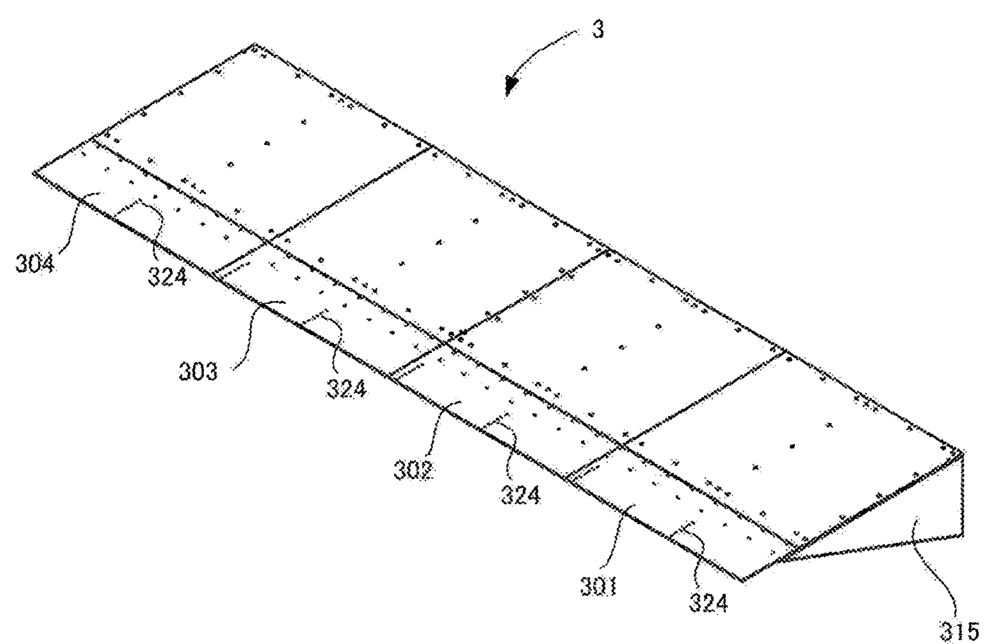
FIG. 4 is a perspective view of a splitter of the measuring device.
Figure 5:
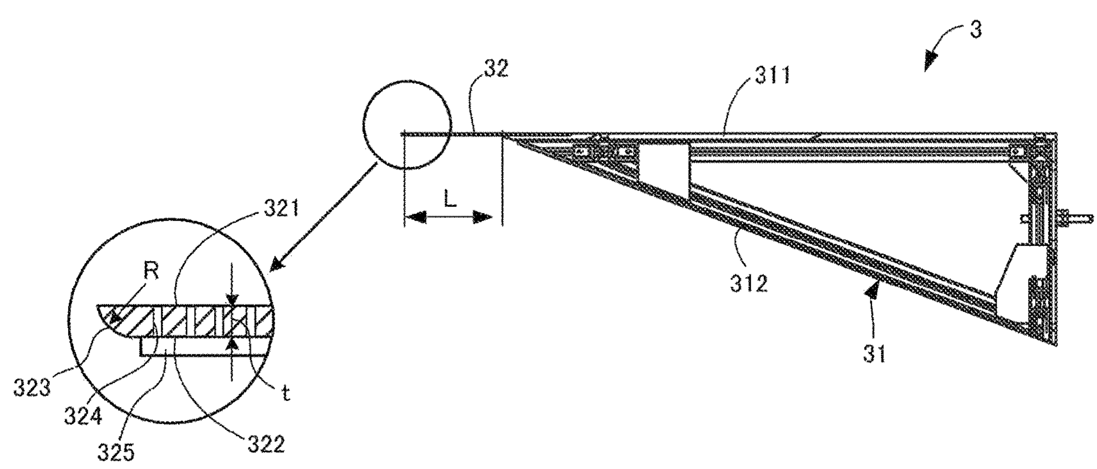
FIG. 5 is a cross-sectional view of FIG. 4.

FIG. 4 is a perspective view of the splitter, and FIG. 5 is a cross-sectional view of FIG. 4. As illustrated in FIGS. 4 and 5, the splitter 3 has a function of thinning a boundary layer formed on an upper surface of the measuring device 2 when air flowing from the blower 1 flows onto the measuring device 2, and includes four splitter pieces 301 to 304 arranged in a left-right direction. Since configurations of the splitter pieces 301 to 304 are the same, the first splitter piece 301, which is one of the splitter pieces, will be described here. The first splitter piece 301 includes a main body portion 31 and a tip member 32 extending from a tip of the main body portion 31. The main body portion 31 has a plate-like upper wall portion 311 and a lower wall portion 312, and an upper surface of the upper wall portion 311 is formed flat so as to be continuous with an upper surface of the first measurement unit 4. The lower wall portion 312 has an inclined surface extending downward toward the rear side. Therefore, the upper wall portion 311 and the lower wall portion 312 are connected so as to form an acute angle in a side view.

The tip member 32 is formed in a plate shape, and is formed such that an upper surface 321 of the tip member 32 and an upper surface of the main body portion 31 are continuous. An end edge on the front side of a lower surface 322 of the tip member 32 is located further on the rear side than an end edge on the front side of an upper surface. Then, a tip surface 323 connecting an end edge of the upper surface 321 and an end edge of the lower surface 322 is formed in an arcuate cross section.

The tip member 32 has a plurality of through holes 324 formed at predetermined intervals in a front-rear direction. Then, a tube member 325 communicating with the through hole 324 is attached to the lower surface 322 of the tip member 32. The tube member 325 is connected to a pressure measurement unit (not illustrated) built in the measuring device 2, and allows measurement of pressure of air flowing on an upper surface of the tip member.

On an upper surface of the measuring device 2, a boundary layer is formed as a part of an airflow flowing from the blower 1 is dragged by frictional force generated between the air flow and the measuring device 2. Here, a component of the air flow excluding the boundary layer is referred to as a main flow. That is, the air flow includes the boundary layer and the main flow in a direction away from the upper surface. The main flow has uniform flow velocity distribution in a height direction based on the upper surface. On the other hand, a flow velocity of the boundary layer, which is smaller than a flow velocity of the main flow and becomes lower as approaching the upper surface, may affect reproducibility when simulation is performed for a traveling state of a vehicle in a wind tunnel test. In view of the above, in the present embodiment, the boundary layer can be thinned by providing the splitter 3 at a tip of the measuring device 2. As a result, influence of the boundary layer on a wind tunnel test can be reduced.

It has been confirmed by the present inventor that a thickness t of the tip member 32, a length L of the tip member 32 protruding forward from the main body portion 31, and a curvature radius R of the tip surface 323 have influence in order to thin the boundary layer described above and reduce influence. For example, the thickness t of the tip member 32 is preferably 1 to 8 mm, and more preferably 3 to 5 mm. The length L of the tip member 32 protruding from the main body portion 31 is preferably 75 to 150 mm, and more preferably 100 to 125 mm. Further, the tip radius R of the tip surface 323 is preferably ⅖ to ⅗ of a thickness of the tip member 32, and more preferably, for example, ½.

Four of the splitter pieces 301 to 304 are coupled so as to be arranged in the left-right direction as described above. Further, among four of the splitter pieces 301 to 304, in the first and fourth splitter pieces 301 and 304 arranged on the right side and the left side, a side opening formed by the upper wall portion 311 and the lower wall portion 312 is closed by a plate-shaped side wall portion 315.

2. First Measurement Unit and Second Measurement Unit

As illustrated in FIGS. 2 and 3, the first measurement unit 4 and the second measurement unit 6 are configured by coupling two measurement modules having the same configuration in the left-right direction (first coupling mode). Here, for convenience of description, right and left measurement modules of the first measurement unit 4 are referred to as first and second measurement modules 401 and 402, respectively. Further, the right and left measurement modules of the second measurement unit 6 will be referred to as third and fourth measurement modules 601 and 602, respectively. Since the first to fourth measurement modules 401, 402, 601, and 602 have the same configuration, the first measurement unit 4 and the first measurement module 401 will be mainly described below.

Figure 6:
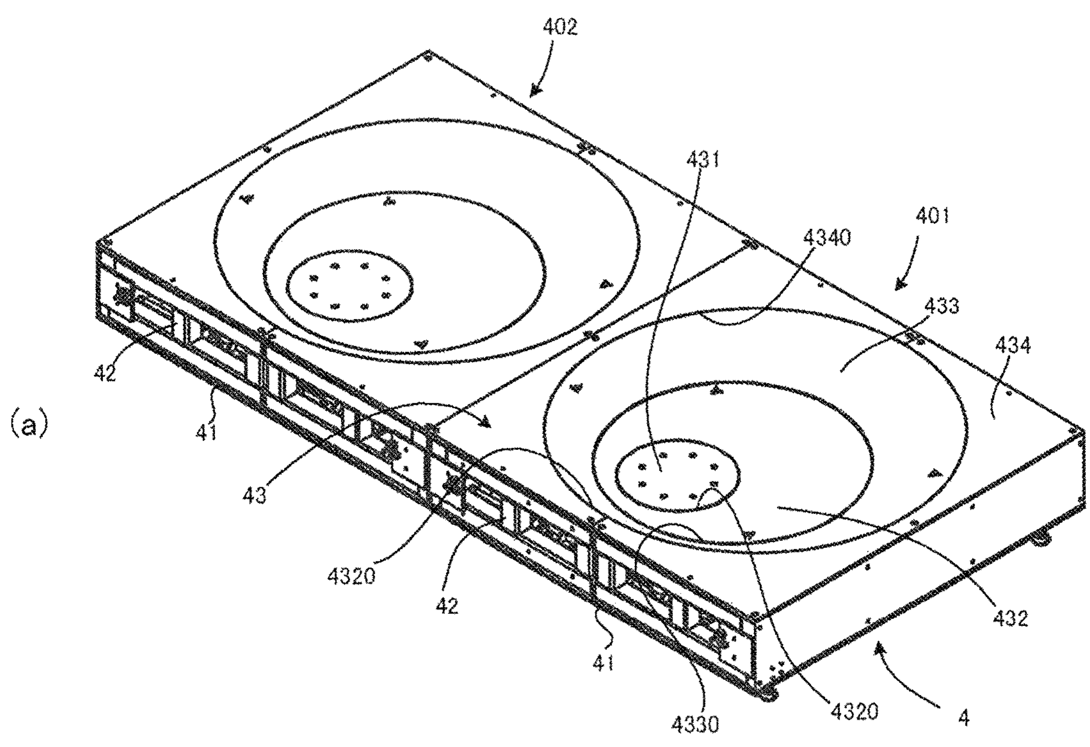
FIG. 6(*a*) is a perspective view and FIG. 6(*b*) is a partial cross-sectional view of a first measurement unit of the measuring device.
Figure 6:
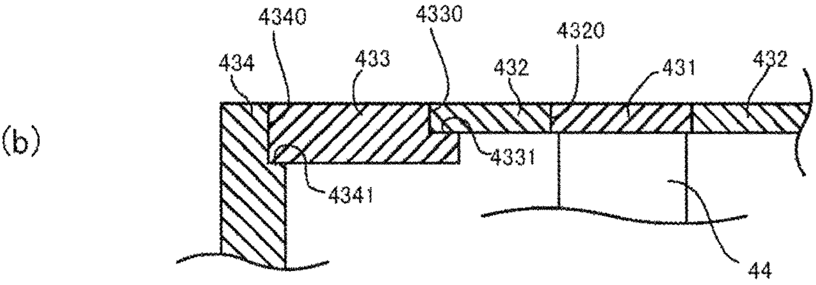
Figure 7:
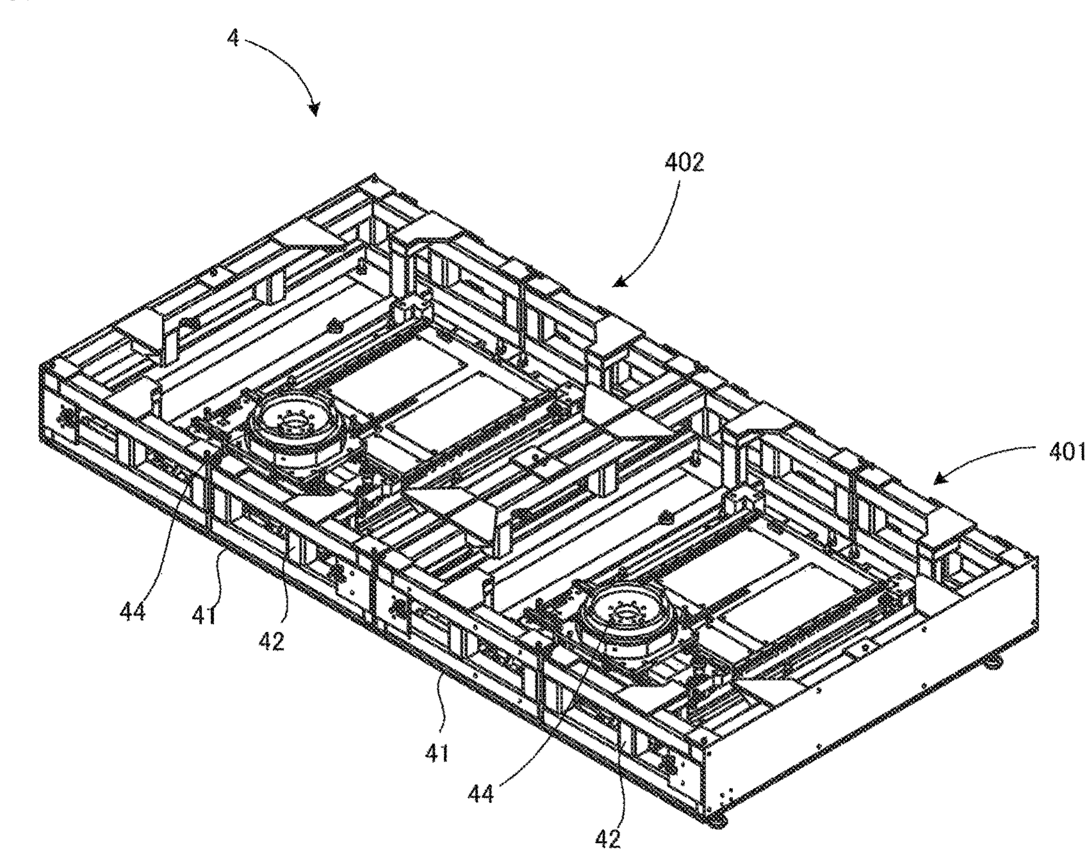
FIG. 7 is a perspective view illustrating a state in which a lid body is removed in the first measurement unit.
Figure 8:
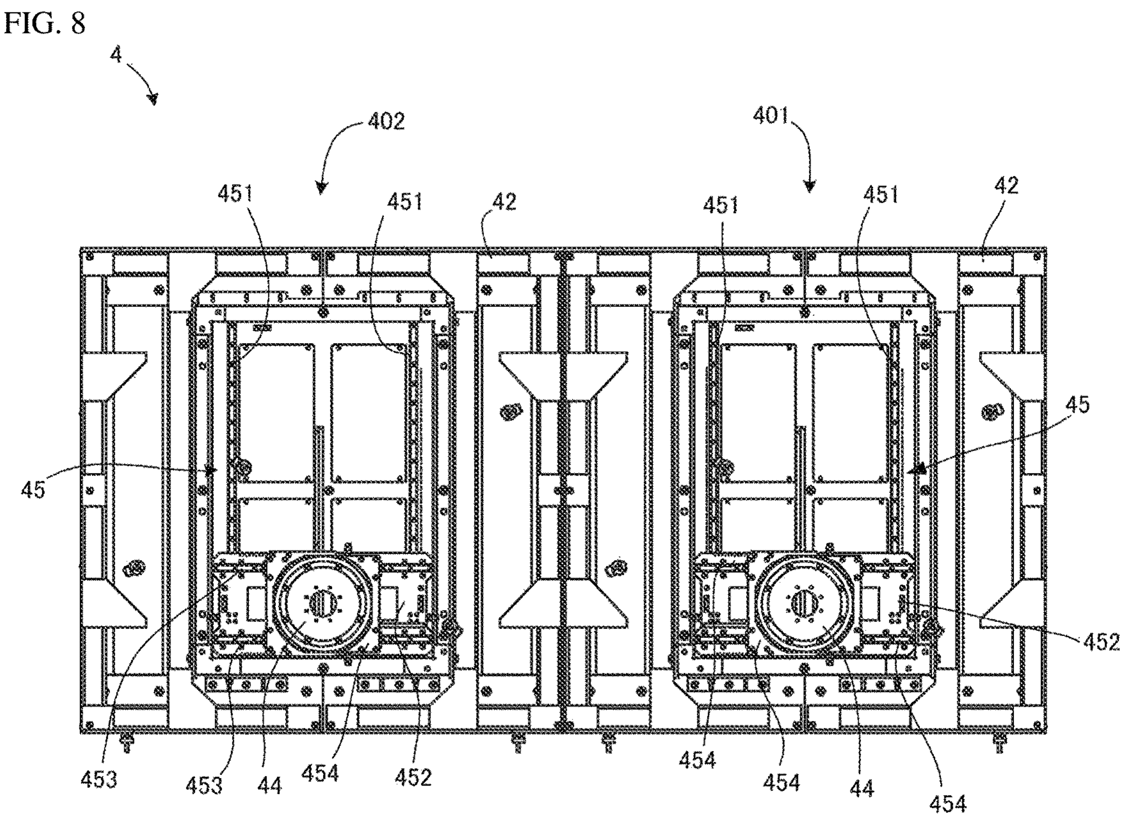
FIG. 8 is a plan view of FIG. 7.

FIG. 6 is a perspective view and a partial cross-sectional view of the first measurement unit, FIG. 7 is a perspective view illustrating a state in which a lid body is removed in the first measurement unit, and FIG. 8 is a plan view of FIG. 7. As illustrated in FIGS. 6 to 8, the first measurement module 401 includes a plate-shaped bottom wall portion 41 having a square shape in plan view, a frame-shaped side frame 42 arranged along a peripheral edge of the bottom wall portion 41, and a lid body 43 having a square shape in plan view for closing an upper opening of the side frame 42, and is formed in a rectangular parallelepiped shape having a low height as a whole. As illustrated in FIG. 7, the first and second measurement modules 401 and 402 are fixed by coupling the side frames 42 to each other with a bolt or the like. Then, a load cell 44 and a moving mechanism 45 of the load cell 44 are arranged in a space surrounded by the bottom wall portion 41, the side frame 42, and the lid body 43.

The moving mechanism 45 is configured as described below. As illustrated in FIG. 8, a pair of first rails 451 extending in parallel in the front-rear direction are arranged on the bottom wall portion 41. A plate-shaped first moving member 452 is provided on the first rail 451, and is movable in the front-rear direction along the first rail 451. Further, a pair of second rails 453 extending in parallel in the left-right direction are arranged on the first moving member 452. A plate-shaped second moving member 454 is provided on the second rail 453, and is movable in the left-right direction along the second rail 453. Then, the load cell 44 is arranged on the second moving member 454.

As the load cell 44, a publicly-known load cell can be used. The load cell 44 is fixed to a wheel support member 431 of the lid body 43 described below, and detects at least one of a drag, a lift, a lateral force, and each moment generated in a vehicle supported by the wheel support member 431 via a wheel of the vehicle. Each of the load cells 44 is connected to a measuring instrument (not illustrated) accommodated in first and sixth rear modules 701 and 706 of the rear portion 7 described later. The measuring instrument accommodates a strain amplifier and a load cell indicator.

Next, the lid body 43 will be described. As illustrated in FIG. 6, the lid body 43 includes the wheel support member 431 that supports the wheel 101 of the vehicle 100, and the wheel support member 431 is fixed to an upper surface of the load cell 44 with a bolt or the like. Then, a first positioning member 432, a second positioning member 433, and a support body member 434 are arranged around the wheel support member 431. More specifically, on the first positioning member 432, a first through hole 4320 which is formed in a disk shape and into which the wheel support member is rotatably fitted is formed. The first through hole 4320 is formed at a position shifted from the center of the first positioning member 432. The second positioning member 433 is formed in a disk shape, and has a second through hole 4330 into which the first positioning member 432 is rotatably fitted. A step 4330 is formed on an inner peripheral surface of the second through hole 4330, and the first positioning member 432 is rotatably arranged on the step 4330. Further, the second through hole 4330 is formed at a position shifted from the center of the second positioning member 433. The support body member 434 has an outer shape formed in a square shape so as to be arranged on the side frame 42, and a third through hole 4340 is formed in a circular shape so as to coincide with the center of the support body member 434. A step 4340 is formed on an inner peripheral surface of the third through hole 4340, and the second positioning member 433 is rotatably arranged on the step 4340.

With this configuration, the wheel support member 431 can be arranged at a desired position of the lid body 43 by rotating each of the first positioning member 432 and the second positioning member 433. Specifically, for example, positioning can be performed as described below.

First, in a state where the first positioning member 432 removed, the load cell 44 and the wheel support member 431 are moved to a predetermined position by the moving mechanism 45. At this time, in a case where the second positioning member 433 interferes with the wheel support member 431, the second positioning member 433 is also removed. Next, after an annular jig is attached around the wheel support member 431, the second positioning member 433 is rotated to bring any part of an inner periphery of the second positioning member 433 into contact with the jig. By the above, a distance of a portion where an outer peripheral surface of the wheel support member 431 and an inner peripheral surface of the second positioning member 433 are closest to each other is defined by the jig. This distance coincides with a closest distance between an outer peripheral surface of the first positioning member 432 and an inner peripheral surface of the first through hole 4320. By the above, a space formed between the wheel support member 431 and the second through hole 4330 coincides with a shape of the first positioning member 432. For this reason, when the first positioning member 432 is fitted into the second through hole 4330, positioning of the wheel support member 431 is completed.

Note that when a plurality of holes are formed on a surface of the first and second positioning members 432 and 433, the positioning members 432 and 433 can be moved by inserting a lever into the holes and then moving the lever.

3. Intermediate Portion

Figure 9:
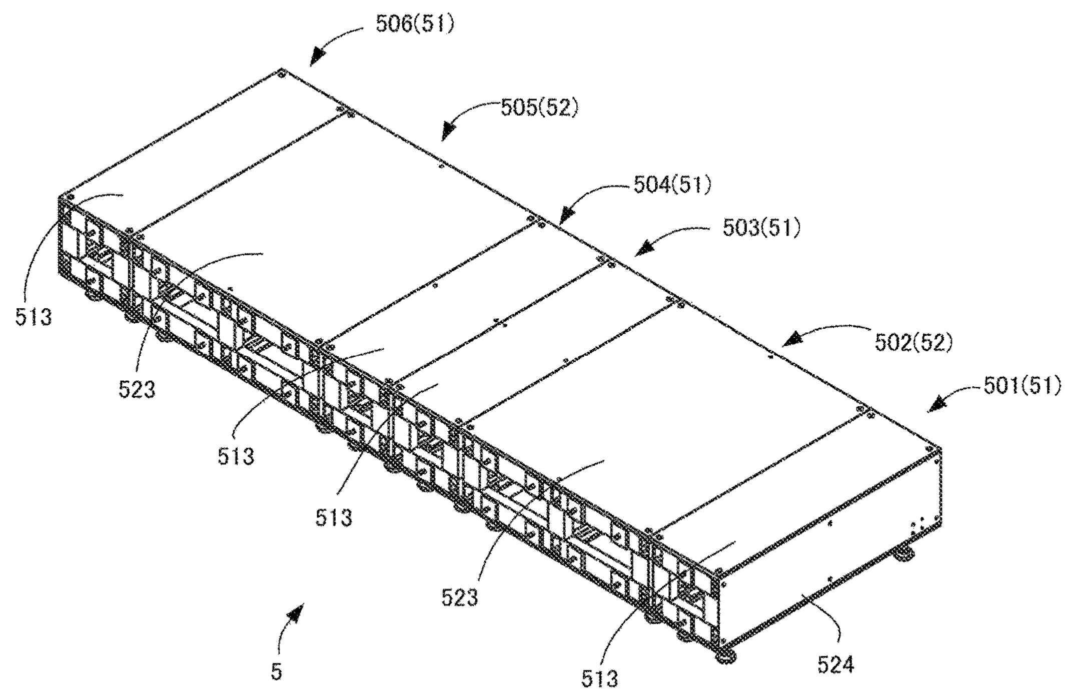
FIG. 9 is a perspective view of an intermediate portion of the measuring device.
Figure 10:
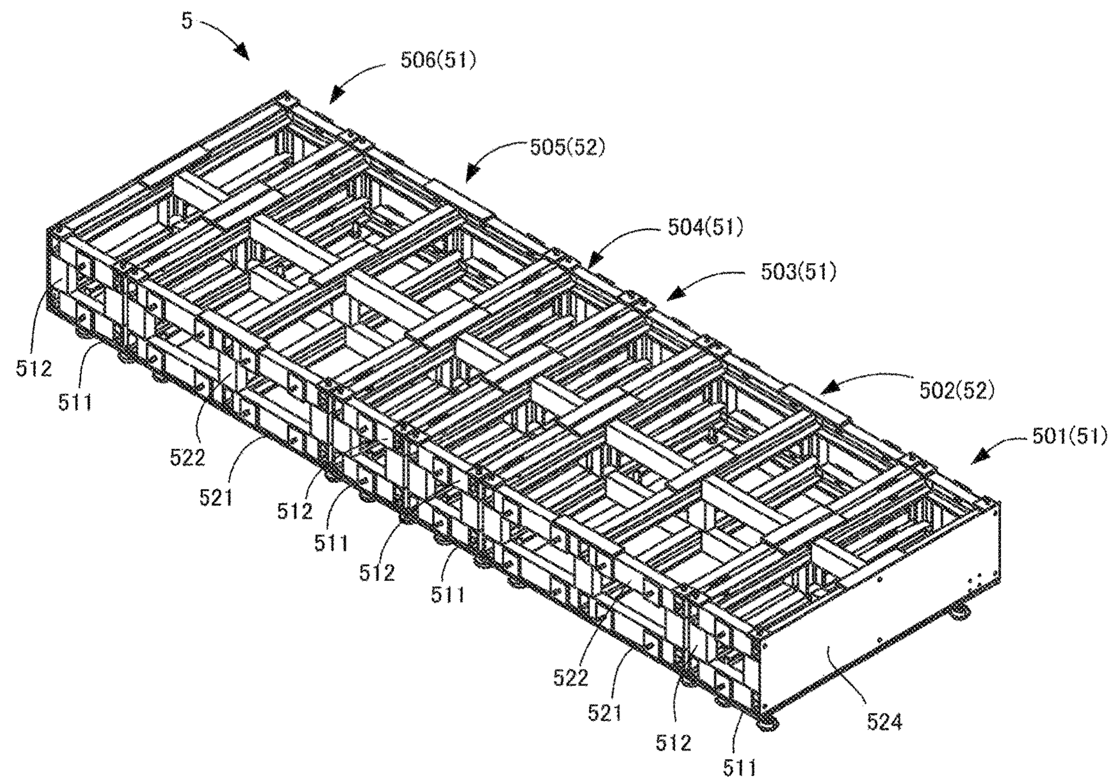
FIG. 10 is a perspective view of a coupling portion in a state where a lid body of the intermediate portion is removed.

FIG. 9 is a perspective view of an intermediate portion, and FIG. 10 is a perspective view of a coupling portion intermediate portion in a state where a lid body is removed. As illustrated in FIGS. 9 and 10, the intermediate portion 5 includes first to sixth intermediate modules 501 to 506 arranged from left to right. Among them, the first, third, fourth, and sixth intermediate modules 501, 503, 504, and 506 are formed of modules having the same shape and rectangular in plan view. Hereinafter, these modules will be referred to as an A-type coupling module 51. Further, the second and fifth coupling modules 502 and 505 are formed of modules having the same shape and a square shape in plan view. Hereinafter, these modules will be referred to as a B-type coupling module 52. The A-type coupling module 51 and the B-type coupling module 52 have the same height and length in the front-rear direction, but the B-type coupling module 52 has a longer length in the left-right direction than the A-type coupling module 51.

The A-type coupling module 51 is formed in a rectangular parallelepiped shape elongated in the front-rear direction, and includes a plate-shaped bottom wall portion 511 having a rectangular shape in plan view, a frame-shaped side frame 512 arranged along a peripheral edge of the bottom wall portion 511, and a lid body 513 having a square shape in plan view and closing an upper opening of the side frame 512, and is formed in a rectangular parallelepiped shape having a low height as a whole. In the A-type coupling module 51, a rectangular closing plate 514 is attached to a right side surface and a left side surface of the side frame 512 in the first and sixth intermediate modules 501 and 506 arranged on both sides of the intermediate portion 5.

The B-type coupling module 52 includes a plate-shaped bottom wall portion 521 having a rectangular shape in plan view, a frame-shaped side frame 522 arranged along a peripheral edge of the bottom wall portion 521, and a lid body 523 having a square shape in plan view and closing an upper opening of the side frame 522, and is formed in a rectangular parallelepiped shape having a low height as a whole. In the B-type coupling module 52, a rectangular closing plate 524 is attached to a right side surface and a left side surface of the side frame 522 in the first and sixth intermediate modules 501 and 506 arranged on both sides of the intermediate portion 5.

As illustrated in FIG. 2, a total width in the left-right direction of two of the A-type coupling modules 51 and one of the B-type coupling module 52 is equal to a width in the left-right direction of one of the measurement modules 401, 402, 601, and 602.

The intermediate portion 5 is configured by using four of the A-type coupling modules and two of the B-type coupling modules and coupling them in the left-right direction as described above. Adjacent modules are coupled to each other by bringing the side frames 512 and 522 into contact with each other and then fixing them with a bolt or the like. Further, the first and second measurement units 4 and 6 are also coupled to each other by bringing side frames into contact with each other and then fixing them with a bolt or the like (second coupling mode).

4. Rear Portion

Figure 11:
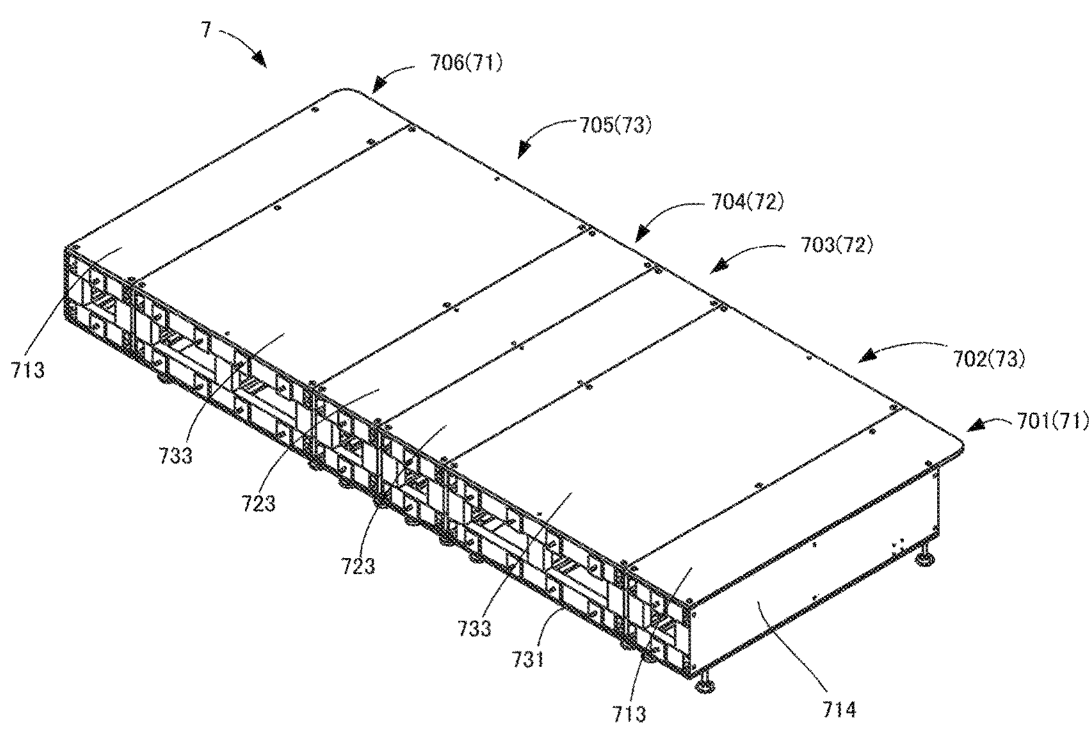
FIG. 11 is a perspective view of a rear portion of the measuring device.
Figure 12:
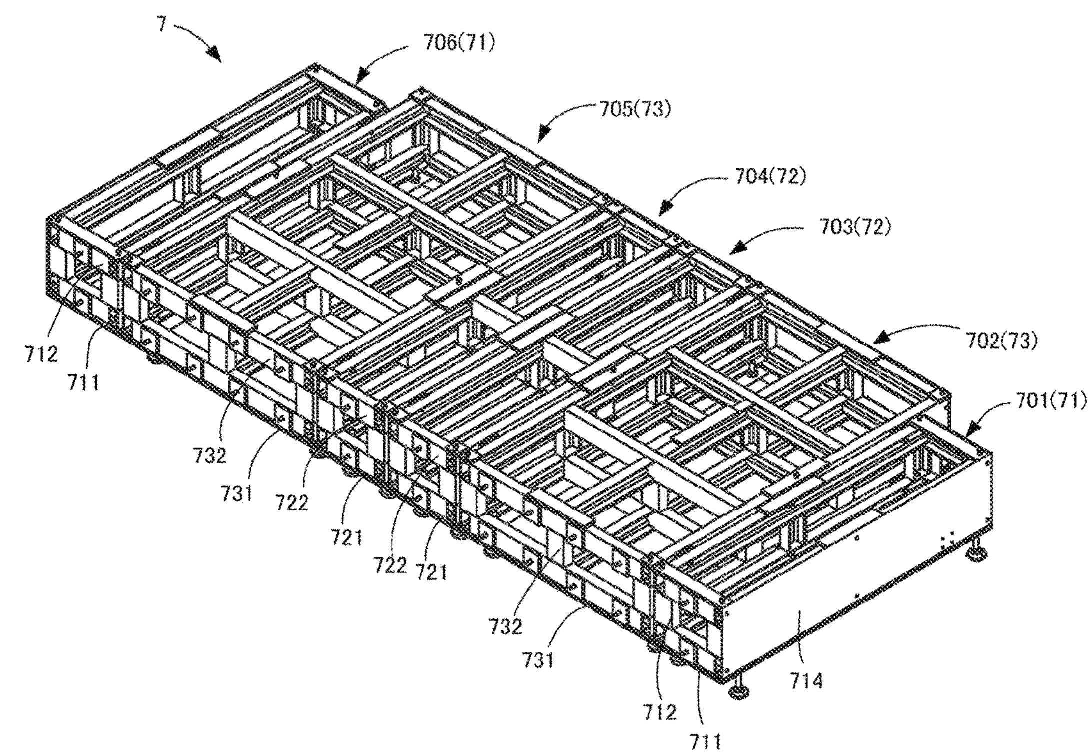
FIG. 12 is a perspective view of the rear portion in a state where a lid body of the rear portion is removed.

FIG. 11 is a perspective view of a rear portion, and FIG. 12 is a perspective view of the rear portion in a state where a lid body is removed. As illustrated in FIGS. 11 and 12, the rear portion 7 includes the first to sixth rear modules 701 to 706 arranged from left to right. Among these, the first and sixth rear modules 701 and 706 are formed of modules having the same shape and having a rectangular shape in plan view. Hereinafter, these modules will be referred to as a C-type coupling module 71. The third and fourth rear modules 703 and 704 are formed of modules having the same shape and a rectangular shape in plan view and having a longer length in the front-rear direction than the first and sixth rear modules 701 and 706. Hereinafter, these modules will be referred to as a D-type coupling module 72. Further, the second and fifth rear modules 702 and 705 are formed of a module having a rectangular shape in plan view and having a longer width in the left-right direction than the third and fourth rear modules 703 and 704. Hereinafter, these modules will be referred to as an E-type coupling module 73.

The C-type coupling module 71 is formed in a rectangular parallelepiped shape elongated in the front-rear direction, and includes a plate-shaped bottom wall portion 711 having a rectangular shape in plan view, a frame-shaped side frame 712 arranged along a peripheral edge of the bottom wall portion 711, and a lid body 713 having a rectangular shape in plan view and closing an upper opening of the side frame 712, and is formed in a rectangular parallelepiped shape having a low height as a whole. The lid body 713 extends further to the rear than the side frame 712, and has the same length in the front-rear direction as the D-type coupling module 72. Further, a rectangular closing plate 714 is attached to a right side surface and a left side surface of the side frame 712 of the C-type coupling module 71.

The D-type coupling module 72 includes a plate-shaped bottom wall portion 721 having a rectangular shape in plan view, a frame-shaped side frame 722 arranged along a peripheral edge of the bottom wall portion 721, and a lid body 723 having a rectangular shape in plan view and closing an upper opening of the side frame 722, and is formed in a rectangular parallelepiped shape having a low height as a whole.

The E-type coupling module 73 includes a plate-shaped bottom wall portion 731 having a rectangular shape in plan view, a frame-shaped side frame 732 arranged along a peripheral edge of the bottom wall portion 731, and a lid body 733 having a rectangular shape in plan view and closing an upper opening of the side frame 732, and is formed in a rectangular parallelepiped shape having a low height as a whole.

As illustrated in FIG. 2, a total width in the left-right direction of one of the C-type coupling module 71, the D-type coupling module 72, and the E-type coupling module 73 is equal to a width in the left-right direction of one of the measurement modules 401, 402, 601, and 602.

The rear portion 7 is configured by using two of each of the C-type, D-type, and E-type coupling modules and coupling them in the left-right direction as described above. Adjacent modules are coupled to each other by bringing the side frames 712,722, and 732 into contact with each other and then fixing them with a bolt or the like. Coupling to the second measurement unit 6 is also performed by bringing side frames into contact with each other and then fixing them with a bolt or the like. Further, the measuring instrument described above is accommodated in the C-type coupling module constituting the first and sixth rear modules 701 and 706. The measuring instrument is connected to an external computer via a cable, and performs data display, analysis, and the like. Since a cable is attached to the measuring instrument as described above, the C-type coupling module 71 is shorter than the adjacent E-type coupling module 73 in order to arrange the cable. For example, in a case where it is desired to extend the cable in the left-right direction, a bent portion of the cable can be arranged in a region covered with the lid body 713 of the C-type coupling module 71. Therefore, the bent portion of the cable can be prevented from being exposed.

5. Wind Tunnel Test

Next, a wind tunnel test using the measuring device configured as described above will be described. First, the measuring device 2 is assembled as described above. Next, the load cell 44 and the wheel support member 431 are arranged at a position corresponding to four of the wheels 101 of the vehicle 100. First, after the load cell 44 is positioned by the moving mechanism 45, the first and second positioning members 432 and 433 are manually rotated so that the wheel support member 431 is arranged immediately above the load cell 44. At this time, a position of each of the load cells 44 is input to a computer connected to the measuring instrument.

Figure 13:
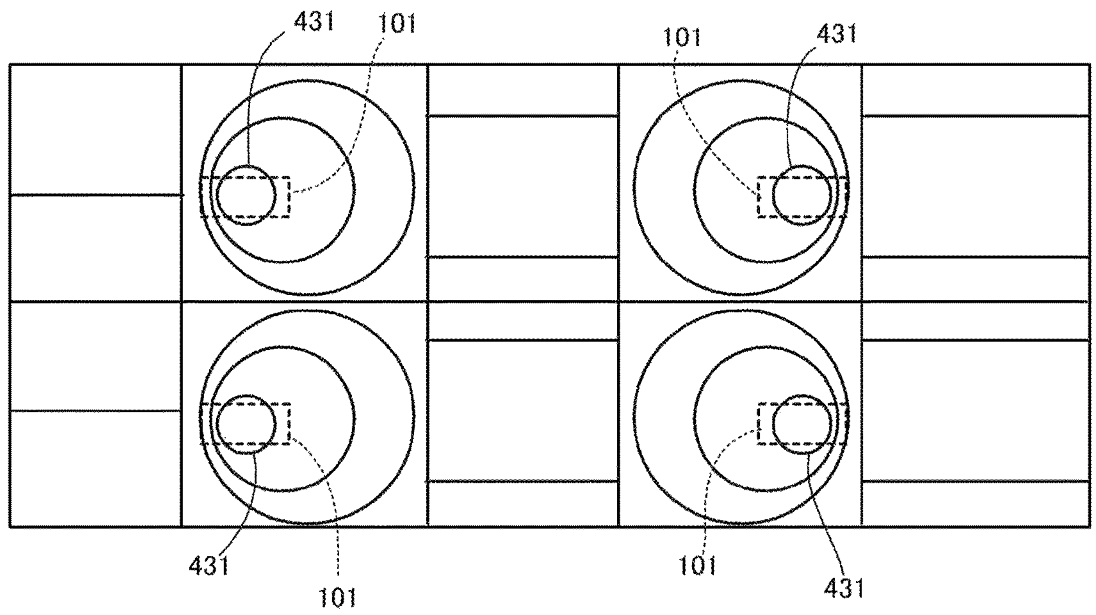
FIG. 13 is a plan view illustrating arrangement of a wheel.

Subsequently, as illustrated in FIG. 13, a vehicle is arranged on the measuring device 2. A position of the vehicle is adjusted such that four of the wheels 101 are located on four of the wheel support members 431. When the vehicle is arranged in this manner, the blower 1 blows air, and the load cell 44 measures the above-described various pieces of data.

6. Feature

In the measuring device 2 configured as described above, an effect below can be obtained.

(1) Since the blower 1 and the measuring device 2 are separated and configured to be movable, and the measuring device 2 can be assembled, a wind tunnel test can be performed at a desired place as compared with a conventional non-movable installation type wind tunnel test device.

(2) In a conventional installation type wind tunnel test device, a suction device that sucks a boundary layer is provided, and the device is complicated and large. However, in the measuring device 2 of the present embodiment, the splitter 3 having a simple configuration is provided at a tip, so that a boundary layer can be thinned and influence can be reduced. For this reason, it is suitable for a portable measuring device, and the device can be simplified.

Figure 14:
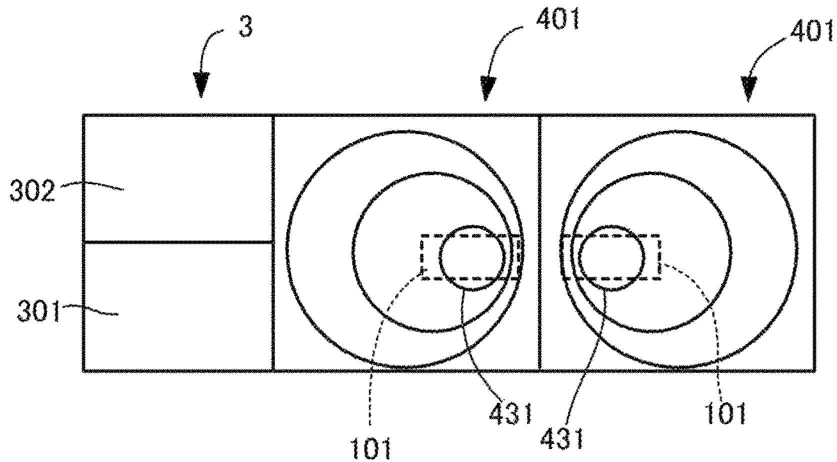
FIG. 14 is a plan view illustrating another layout of the measuring device.
Figure 15:
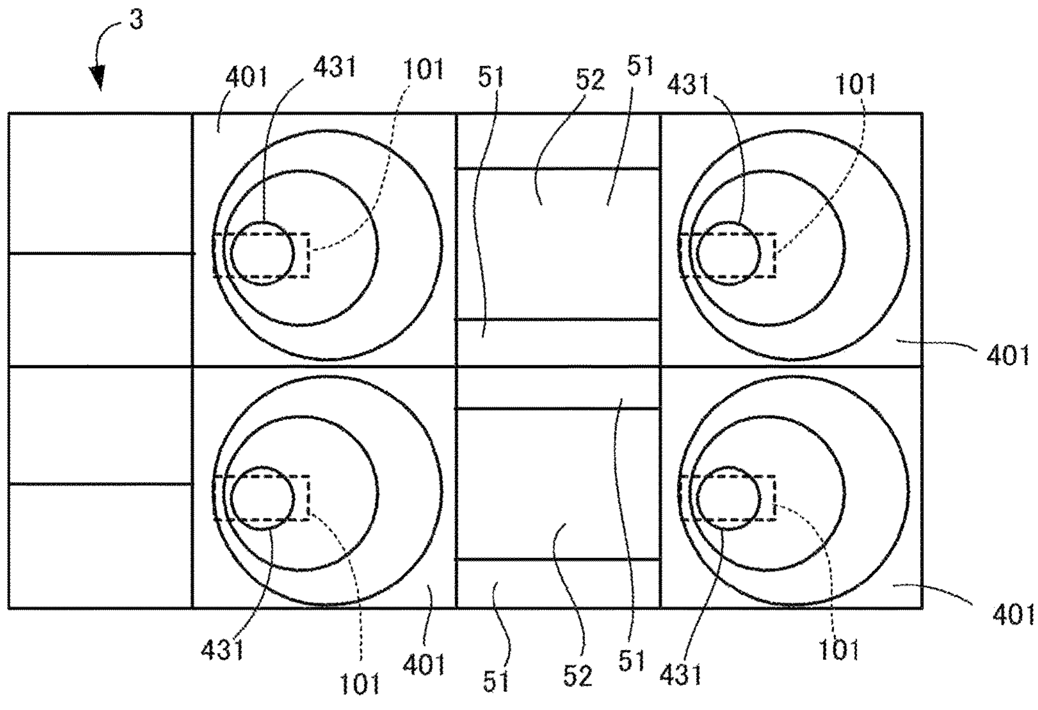
FIG. 15 is a plan view illustrating another layout of the measuring device.

(3) The measuring device 2 is configured by combining one type of the measurement module 401 and five types of the coupling modules 51, 52, and 71 to 73. For this reason, by appropriately combining these modules, the present invention can be applied to a wind tunnel test of vehicles having the wheels 101 that are different in number and position. For example, in the above description, a wind tunnel test of a four-wheeled vehicle is described. However, for example, as illustrated in FIG. 14, when the splitter 3 including two of the splitter pieces 301 and 302 and two of the measurement modules 401 are coupled, a wind tunnel test of a two-wheeled vehicle such as a bicycle or a motorcycle can be performed. Further, as illustrated in FIG. 15, it is also possible to perform a wind tunnel test of a small four-wheeled vehicle by coupling four of the measurement modules 401, the A-type coupling module 51, and the B-type coupling module 52. That is, it is not necessary to use all types of coupling modules, and the measuring device can be configured using any of them. In addition to the above, a wind tunnel test of a tricycle such as a trike can also be performed. Further, since each module can be separably coupled, a measuring device corresponding to a plurality of types of vehicles can be formed any number of times.

(4) In the measuring device 2 according to the present embodiment, since a plurality of the load cells 44 are used in accordance with positions of the wheels 101, the measuring device 2 can be downsized, as compared with a case where various vehicles are measured by one measuring device such as a conventional wind tunnel balance. Further, since the load cell 44 is arranged for each wheel, responsiveness of measurement can be enhanced. Further, a position of the load cell 44 can be accurately positioned by the moving mechanism 45 of each of the measurement modules 401, 402, 601, and 602, and an upper surface of each of the lid bodies 43 is flat even if a position of the wheel support member 431 is changed, so that combination of these enables accurate measurement of force received from the wheel 101. In particular, when a moment applied to a vehicle body is calculated, it is necessary to accurately position the load cell 44 at a position of the wheel 101 since calculation needs to be performed using a pitch of a wheel (for example, wheel base and tread base dimensions). Therefore, the measuring device 2 according to the present embodiment is suitable. Furthermore, by providing the load cell 44 for each of the wheels 101, thickness of the measurement modules 401, 402, 601, and 602 can be reduced. Therefore, the measuring device 2 having excellent portability can be realized.

7. Variation

Although the first embodiment of the present invention is described above, the present invention is not limited to the above embodiment, and various changes can be made without departing from the gist of the present invention. Note that variations below can be appropriately combined.

Figure 16:
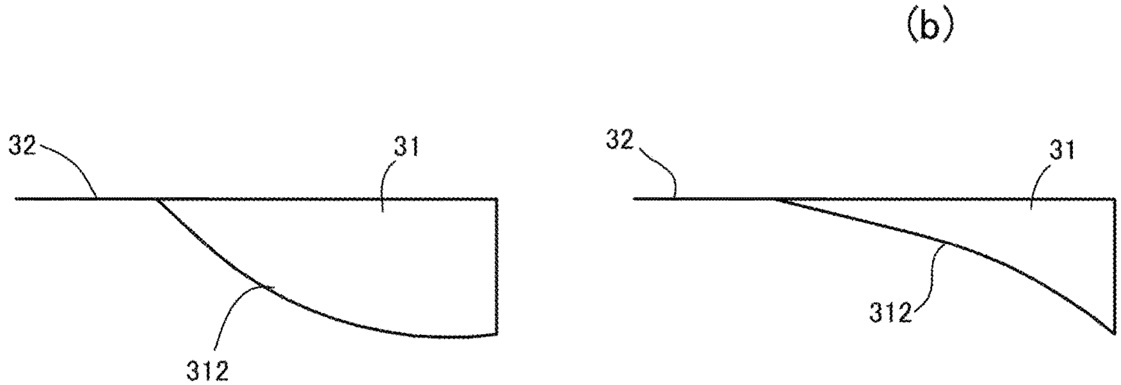
FIG. 16 is a cross-sectional view illustrating another example of a main body portion of the splitter.

(1) A shape of the splitter 3 is not particularly limited, and various shapes can be employed. For example, as illustrated in FIG. 16(*a*), a cross-sectional shape of an inclined surface of the lower wall portion 312 of the main body portion 31 can be a curved shape projecting downward. Alternatively, as illustrated in FIG. 16(*b*), a cross-sectional shape of an inclined surface of the lower wall portion 312 of the main body portion 31 can be a curved shape projecting upward.

Figure 17:
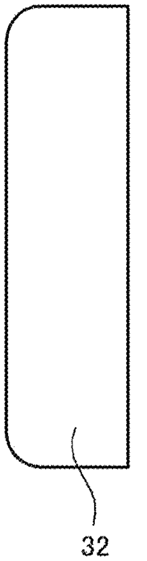
FIG. 17 is a plan view illustrating another example of a tip member of the splitter.
Figure 17:
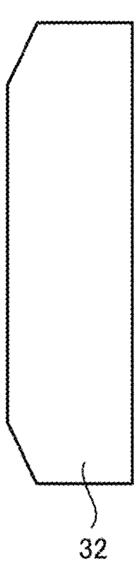
Figure 17:
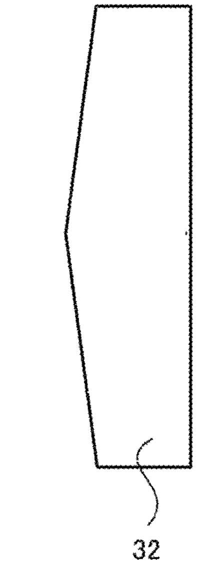
Figure 17:
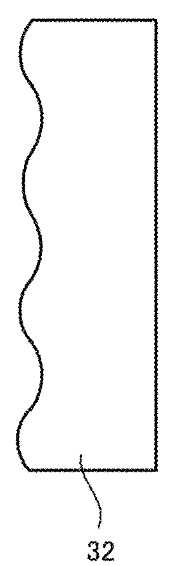
Figure 17:
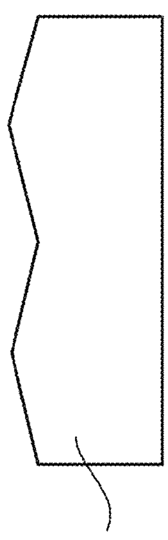

A planar shape of the tip member 32 can also be various shapes other than a rectangular shape. For example, in FIG. 17(*a*), left and right corner portions are formed in an arc shape. In FIG. 17(*b*), left and right corner portions are chamfered. FIG. 17(*c*) illustrates a chevron shape in which the center of a tip protrudes. In FIG. 17(*d*), a tip is formed in a waveform. In FIG. 17(*e*), a plurality of chevron-shaped protruding portions are formed at a tip. Further, positions and the number of through holes for measuring pressure on an upper surface of the splitter 3 are not particularly limited, and the through holes can be appropriately provided.

(2) In the above embodiment, the measuring device is configured using one type of measurement module and five types of coupling modules, but this is an example and the present invention is not limited to this. That is, the measuring device only needs to be able to be configured by using at least one of the first coupling mode in which a plurality of measurement modules are coupled to each other and the second coupling mode in which a plurality of measurement modules are coupled to each other by a coupling module. For this reason, measurement modules and coupling modules having different shapes can be further prepared, and this allows the present invention to be applied to a wind tunnel test of various vehicles having wheels different in number and position.

(3) A configuration of the measurement module is not particularly limited, and at least one of the load cells 44 only needs to be arranged. Further, the measurement module may be configured such that positions of the load cell 44 and the wheel support member 431 are not changeable as in the above embodiment, and positions of these are fixed. Even if such a measurement module is used, a position between measurement modules can be adjusted by using the coupling module, so that a load cell can be arranged at a position of a wheel. Further, a plurality of load cells can be arranged in one measurement module. Furthermore, a shape of the measurement module is not particularly limited, and can be various shapes such as a polygonal shape in addition to a rectangular shape in plan view as described above.

(4) In the above embodiment, the load cell 44 is moved in two directions orthogonal to each other on a horizontal plane by the first rail 451 and the second rail 453, but a configuration of the moving mechanism 45 of the load cell 44 is not limited to this. That is, the load cell 44 only needs to be configured to be movable in the measurement module 401. For example, a plurality of holes can be formed at predetermined intervals in the bottom wall portion 41, the load cell 44 can be arranged at an optional position of the bottom wall portion 41, and then a bolt or the like can be inserted into the hole to fix the load cell.

(5) In the above embodiment, the wheel support member 431 is moved by two of the positioning members 432 and 433, but a moving mechanism (second moving mechanism) having a configuration for arranging the wheel support member 431 at an optional position of the lid body 43 is also not limited to this. That is, another configuration may be employed as long as the wheel support member 41 can move in the lid body 43 while an upper surface of the lid body 43 remains flat. For example, in the above embodiment, the wheel support member 431 is moved by two of the positioning members 432 and 433, but three or more disk-shaped positioning members may be used. Alternatively, one disk-shaped positioning member may be used.

Further, when the wheel support member 431 is moved together with the load cell 44, the first positioning member 432 and the second positioning member 433 can be configured to rotate in conjunction with the movement. At this time, rotation of the first positioning member 432 and the second positioning member 433 can be assisted by a motor or the like. Further, a configuration of fixing the first positioning member 432 and the second positioning member 433 so as not to move after the wheel support member 431 is positioned may be included.

Further, the wheel support member 431 is formed in a rectangular shape, and a plurality of segmented insertion type blocks having a rectangular shape in plan view are inserted around the wheel support member 431 to form the lid body 43. By the above, the wheel support member 41 can be moved in the lid body 43 while an upper surface of the lid body 43 remains flat. Further, a periphery of the wheel support member 431 may be filled with a shutter that is movable forward, backward, left, and right instead of a block.

(6) In the measurement module, the first and second positioning members 432 and 433 are manually rotated, but each of the positioning members 432 and 433 can also be rotated by a drive device such as a motor. By the above, the wheel support member can be automatically positioned. This point is similar to the moving mechanism 45 that moves the load cell 44.

(7) In the above embodiment, a worker measures a position of the load cell 44 and inputs the position to a computer, but the work can be automatically performed. That is, a detector that detects a position of the load cell 44 can be provided. As the detector, for example, encoders are provided in the moving mechanism 45, and a position of each of the load cells 44 can be detected by these encoders. Further, a relative positional relationship between the load cells 44 can be measured, and a position of the load cell 44 can be detected based on the relative positional relationship. Further, in addition to an encoder, various detectors such as a potentiometer, a resolver, and a laser can be used.

(8) A configuration of the coupling module is not particularly limited, and the coupling module only needs to be configured so as to be able to be coupled to the measurement module such that an upper surface is continuous with an upper surface of the measurement module. Further, a shape of the coupling module is not particularly limited, and can be various shapes such as a polygonal shape in addition to a rectangular shape in plan view as described above.

(9) As the measuring device main body, an integrated measuring device in which a load cell is fixed in advance can be used instead of the assembled type as in the above embodiment. Further, instead of a plurality of load cells, a measuring device having one measuring unit for a wind tunnel test can also be used.

(10) A configuration of the blower 1 is not particularly limited, and a publicly-known blower can be used. In consideration of portability, it is preferable to use a plurality of blowers that can be combined according to air volume.

DESCRIPTION OF REFERENCE SIGNS

1: Blower
2: Measuring device
3: Splitter
31: Main body portion
32: Tip member
4: Measurement module
44: Load cell
45: Moving mechanism
51, 52: Coupling module
71 to 73: Coupling module

The invention claimed is:

1. A measuring device for a vehicle arranged on a downstream side of air blown from a blower for a wind tunnel test, the measuring device comprising:

a measuring device main body configured to allow a vehicle to be arranged and configured to be movable with respect to the blower; and a splitter coupled to an end portion facing the blower side in the measuring device main body, wherein the splitter comprises:

a main body portion having an upper surface continuous with an upper surface of the measuring device main body and a lower surface having a surface extending further downward as a distance from the blower side increases; and a plate-shaped tip member extending from a tip of the main body portion toward the blower side, wherein an upper surface of the tip member and an upper surface of the main body portion are formed to be continuous, an end edge on the blower side of a lower surface of the tip member is located closer to the main body portion side than an end edge on the blower side of an upper surface of the tip member, and a tip surface connecting an end edge of the upper surface and an end edge of the lower surface is formed to have an arcuate cross-section.

2. The measuring device according to claim 1, wherein a length of the tip member protruding from the main body portion is 75 to 150 mm, and a thickness of the tip member is 1 to 8 mm.

3. The measuring device according to claim 1, wherein a tip radius of the tip surface is $\frac{2}{5}$ to $\frac{3}{5}$ mm of a thickness of the tip member.

4. The measuring device according to claim 1, wherein the measuring device main body is configured by coupling a plurality of measurement modules in which at least one load cell is accommodated.

5. The measuring device according to claim 1, further comprising:

a plurality of measurement modules in which at least one load cell is accommodated; and at least one coupling module, wherein the measuring device main body is configured by using at least one of a first coupling mode in which the plurality of measurement modules are coupled to each other and a second coupling mode in which the plurality of measurement modules are coupled to each other via the coupling module.

6. The measuring device according to claim 4, wherein each of the measurement modules comprises:

a flat lid body that supports a wheel of the vehicle; and a moving mechanism capable of changing a position of the load cell below the lid body, the lid body comprises:

a disk-shaped wheel support member that supports the wheel and is fixed to the load cell;

a disk-shaped first positioning member having a first through hole into which the wheel support member is fitted;

a disk-shaped second positioning member having a second through hole into which the first positioning member is rotatably fitted; and a support body portion having a third through hole into which the second positioning member is rotatably fitted, wherein the wheel support member can be arranged immediately below the wheel by rotation of the first and second positioning members, and the load cell measures force acting on the wheel support member.

7. A wind tunnel test device comprising:

the measuring device according to claim 1; and a movable blower.

* * * * *